No. 756,709. PATENTED APR. 5, 1904.
J. F. RIEMAN.
NUT LOCK.
APPLICATION FILED JUNE 30, 1903.
NO MODEL.

WITNESSES:
Paul Hunter
Wm P Patton

INVENTOR
John F. Rieman
BY
ATTORNEYS.

No. 756,709. Patented April 5, 1904.

UNITED STATES PATENT OFFICE.

JOHN F. RIEMAN, OF GOSHEN, INDIANA.

NUT-LOCK.

SPECIFICATION forming part of Letters Patent No. 756,709, dated April 5, 1904.

Application filed June 30, 1903. Serial No. 163,722. (No model.)

*To all whom it may concern:*

Be it known that I, JOHN F. RIEMAN, a citizen of the United States, and a resident of Goshen, in the county of Elkhart and State of Indiana, have invented a new and Improved Nut-Lock, of which the following is a full, clear, and exact description.

The object of my invention is to provide a novel simple nut-lock that may be easily applied and removed, that effectively holds a loose nut, permits of convenient release for tightening the nut against an object, takes up no available room, is perfectly reliable in service, and that may be produced at low cost.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1:
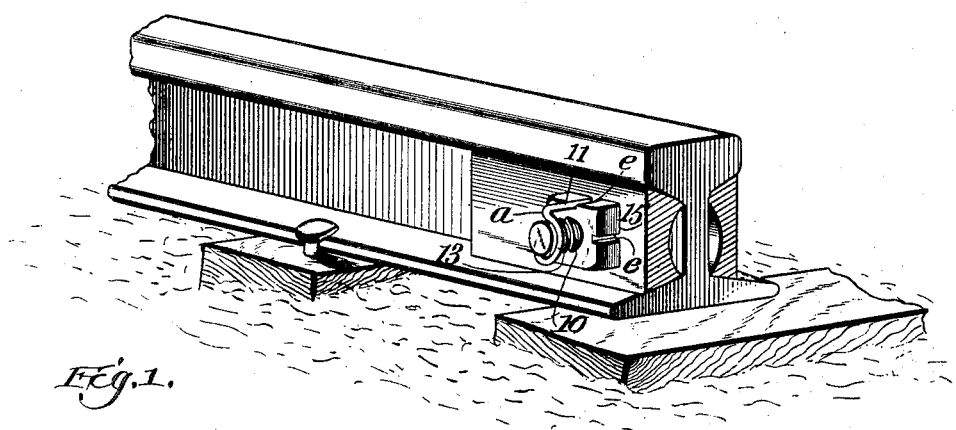
Figure 2:
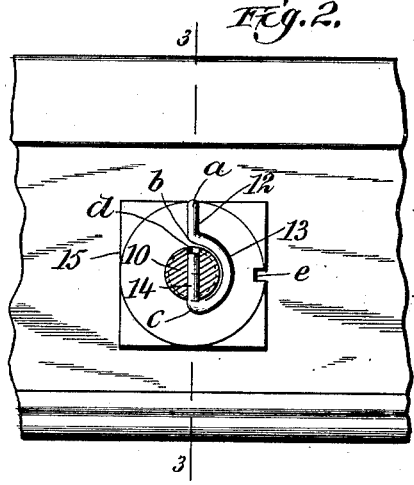
Figure 3:
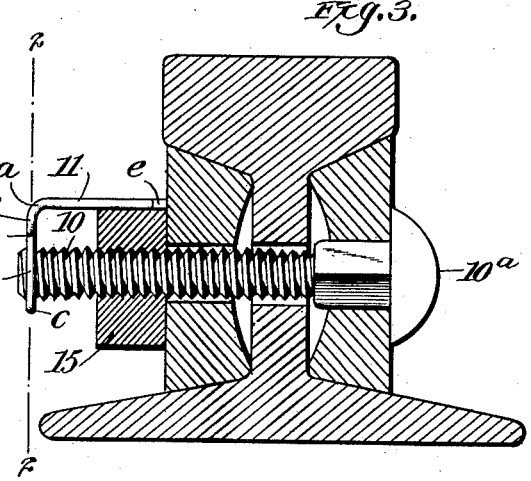
Figure 4:
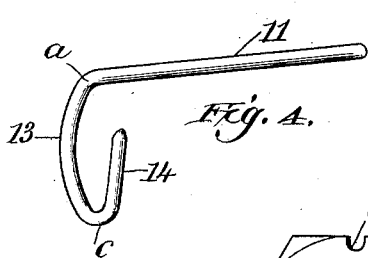
Figure 6:
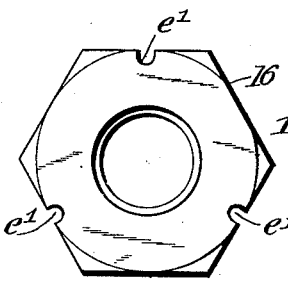
Figure 5:
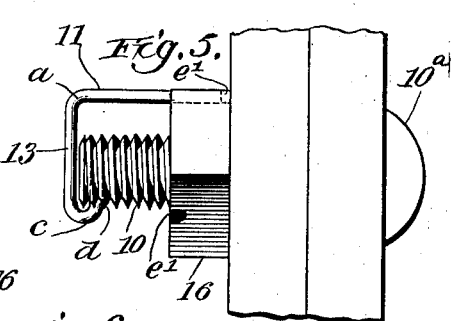

Figure 1 is a perspective view of the improved nut-lock applied to hold a nut on a track-rail bolt that clamps fish-plates upon a track-rail. Fig. 2 is a side view of a track-rail, a part being in section on the line 2 2 in Fig. 3, showing a bolt, a nut screwed upon the bolt and having contact with the web of the track-rail, and the improved nut-lock shown engaged with the bolt and nut. Fig. 3 is a transverse sectional view substantially on the line 3 3 in Fig. 2. Fig. 4 is a detached perspective view of a modified form of the nut-lock proper. Fig. 5 is a side view of the improvement applied for holding a hexagonal nut upon a bolt that is applied for clamping material, and Fig. 6 is an end view of a hexagonal nut having features of the improvement.

The invention may be applied for holding a nut on a bolt of any size, and is adapted to lock a square or hexagonal nut on a bolt with equal facility and reliability, as will appear from the subjoined description of the improvement.

To illustrate the application of the improved nut-lock, it is shown in connection with a track-rail-joint bolt, employed in any desired number for holding fish-plates clamped upon contiguous ends of two track-rails where they are jointed together. The bolt 10 may have any shaped head $10^a$ that is preferred and also be formed with an angular body portion near the head, which part of the bolt when inserted through a correspondingly-shaped opening in a fish-plate or other material will prevent the bolt from turning. The nut-lock proper is preferably formed of a single piece of wire rod of suitable gage and may be protected with a non-oxidizing coating.

To form the locking device, the piece of wire employed is primarily straight and may have its ends rounded.

In one form of the invention, as shown in Figs. 2 and 3 at $a$, intermediately of the ends of the wire rod, a right-angular bend is made, and again at $b$ the material is bent laterally and downwardly, so as to provide a semicircular member, these bends producing a straight locking member 11, that is defined in length by the bend $a$, from which depends the shorter member 12, and from which at $b$ the curved member 13 extends laterally, ending at $c$, where an acute-angular bend is formed, thus projecting the remaining portion 14 of the material toward the depending member 12.

The bolt-body 10 is perforated transversely at a point near the end of its threaded portion, this perforation $d$ having such diameter as adapts it to receive the tenon member 14, that should fit neatly therein.

It will be seen that the complete insertion of the tenon 14 into the perforation $d$ will dispose the curved member 13 at one side of the bolt-body and the straight member 11 a short distance from the bolt in a plane parallel with its longitudinal axis.

The nut is represented as square in Figs. 1, 2, 3 and as hexagonal in Figs. 5 and 6. The square nut (designated by the reference character 15) is adapted to screw upon the bolt-body 10 and be made to contact with material that may be a fish-plate or other material. In each of the two adjacent sides of the nut 15 a groove $e$ is produced, which extends between the ends of the nut at the centers of the sides, respectively.

The nut 15, having been screwed to a bearing upon material it is to have contact with, may be held as adjusted by means of the locking device that is readily placed in position for service by first inserting the tenon member 14 completely into the perforation $d$ in the bolt-body 10, after which the locking member 11 is swung around into a plane parallel with the axis of the bolt and into seated engagement within one of the grooves $e$.

It will be seen that the stress of the resilient locking member 11 will hold the nut from a retrograde turning movement, and as the tenon 14 is in the same plane with the members 11 and 12 the full tensional force of these members will be exerted to hold the groove engaged by the member 11 in the same plane with that of the members 11, 12, and 14.

In Figs. 5, 6 it will be seen that the hexagonal nut 16 has a locking-groove $e'$, formed in each alternate side for the reception of the locking member 11, and it may here be explained that it is essential for the durability of the nuts 15 and 16 that grooves should not be located in opposite sides, as this would weaken them, although in large nuts each side may be grooved, if desired.

In Figs. 4 and 5 the improved nut-lock is shown slightly modified in form, the member 12 in this case being dispensed with and the member 13 curved laterally from the bend $a$, the tensional force of the device in this construction being afforded by the members 11 and 14, that are disposed in the same plane, as before specified.

A plurality of perforations $d$ may be formed at spaced intervals in the bolt-body 10 to permit an adjustment of the nut-lock thereon for a proper engagement with the grooved nut 15 or 16, that may be screwed more or less upon the bolt as the thickness of the engaged material may require.

It will be seen that the tension of the nut-lock exerted in one plane upon the nut will prevent rattling of a loose nut as well as hold the nut from turning on the bolt.

At any time it may become necessary to tighten a nut having the improvement the nut-lock may be released readily from the nut by simply swinging the member 11 out of and away from the groove $e$ or $e'$, which grooves, as shown, may be either rounded or angular at their bases.

Having thus described my invention, I claim as new and desire to secure by Letters Patent—

1. A nut-lock, comprising a resilient metal rod bent to form a straight member, a laterally-curved member joined to one end of the straight member, and a tenon member projected from the remaining end of the curved member, the straight member and tenon being at right angles to one another and disposed in the same plane.

2. A nut-lock, comprising a resilient metal rod bent intermediate of its ends to form right-angled members, a laterally-curved member projected from the end of one of the said members, and a tenon member projecting from the end of the curved member toward the member from which the curved member is projected.

3. The combination with a nut having grooved sides and a bolt transversely perforated in its threaded body, of a nut-lock, comprising a wire rod bent between its ends at a right angle, providing a straight locking member to engage with one of the grooves in the nut, the wire rod being again bent laterally and downwardly in curved form, and finally bent to project the remaining end portion of the wire as a tenon toward the straight locking member in the same plane therewith, the tenon member engaging within the perforation in the bolt-body when the nut-lock is applied for holding a nut that is screwed on the bolt-body.

In testimony whereof I have signed my name to this specification in the presence of two subscribing witnesses.

JOHN F. RIEMAN.

Witnesses:
A. W. HOSIG,
GEO. S. GRUBB.